United States Patent
Okazaki et al.

(10) Patent No.: US 10,754,596 B2
(45) Date of Patent: Aug. 25, 2020

(54) IMAGE FORMING APPARATUS

(71) Applicant: KYOCERA Document Solutions Inc., Osaka-shi, Osaka (JP)

(72) Inventors: Yusuke Okazaki, Osaka (JP); Akira Ohashi, Osaka (JP); Yukihiro Shibata, Osaka (JP); Satoshi Sato, Osaka (JP); Yuki Yamamoto, Osaka (JP); Koji Tagaki, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/508,060

(22) Filed: Jul. 10, 2019

(65) Prior Publication Data
US 2020/0019358 A1    Jan. 16, 2020

(30) Foreign Application Priority Data

Jul. 13, 2018 (JP) ................................ 2018-132771

(51) Int. Cl.
*G06F 3/12* (2006.01)
*G06K 9/00* (2006.01)
*H04N 1/00* (2006.01)

(52) U.S. Cl.
CPC .......... *G06F 3/1238* (2013.01); *G06F 3/1221* (2013.01); *G06K 9/00362* (2013.01); *H04N 1/00896* (2013.01)

(58) Field of Classification Search
CPC . G06F 3/1238; G06F 3/1221; H04N 1/00896; G06K 9/00362

USPC ........................................................ 358/1.15
See application file for complete search history.

(56) References Cited

U.S. PATENT DOCUMENTS

| | | | |
|---|---|---|---|
| 2014/0104636 A1* | 4/2014 | Baba .................. | H04N 1/00891 358/1.14 |
| 2014/0376020 A1 | 12/2014 | Imamura | |
| 2015/0381841 A1 | 12/2015 | Imamura | |
| 2017/0134600 A1 | 5/2017 | Imamura | |
| 2018/0316814 A1 | 11/2018 | Imamura | |
| 2019/0202200 A1* | 7/2019 | Langhelt .............. | B41J 2/04586 |

FOREIGN PATENT DOCUMENTS

JP        20155930 A       1/2015

* cited by examiner

*Primary Examiner* — Tammy Paige Goddard
*Assistant Examiner* — Darryl V Dottin
(74) *Attorney, Agent, or Firm* — Alleman Hall Creasman & Tuttle LLP (57) ABSTRACT

An image forming apparatus includes a communication device, a received data processing portion, a human detection sensor, a sensitivity setting portion, a rest control portion, and a return control portion. The sensitivity setting portion sets, based on content of the job data, the sensitivity of the human detection sensor for a time when specific devices including the received data processing portion are in a predetermined rest state. The rest control portion causes the specific devices to transit to the rest state when a predetermined rest condition is satisfied. The return control portion causes the specific devices to transit from the rest state to a return state when the human detection sensor detects a human body in the situation where the specific devices are in the rest state, wherein larger power is consumed in the return state than in the rest state.

4 Claims, 5 Drawing Sheets

IMAGE FORMING APPARATUS

INCORPORATION BY REFERENCE

This application is based upon and claims the benefit of priority from the corresponding Japanese Patent Application No. 2018-132771 filed on Jul. 13, 2018, the entire contents of which are incorporated herein by reference.

BACKGROUND

The present disclosure relates to an image forming apparatus that includes a human detection sensor.

Upon receiving a print request together with print data from a host apparatus, the image forming apparatus executes a print process based on the print data.

In addition, when a predetermined rest condition is satisfied, the image forming apparatus causes specific devices, such as a print processing device and a print engine, to transit to a rest state. The state of the image forming apparatus in which the specific devices are in the rest state is called a power saving state, a sleep state or the like.

The rest condition is, for example, that a power saving key has been operated, or that the print process has not been requested for a predetermined time period.

In addition, the image forming apparatus may include a human detection sensor. In this case, when the human detection sensor detects a human body in a situation where the specific devices are in the rest state, the image forming apparatus automatically causes the specific devices to transit from the rest state to a predetermined state.

In addition, there is known a technology in which when a power control portion of the image forming apparatus causes the image forming apparatus to transit to the power saving state in response to an operation of the power saving key, a transition from the power saving state to the normal power state is restricted until the human detection sensor no longer detects the human body.

SUMMARY

An image forming apparatus according to an aspect of the present disclosure includes a communication device, a received data processing portion, a human detection sensor, a sensitivity setting portion, a rest control portion, and a return control portion. The communication device receives, from another apparatus, job data that includes processing object data and a processing request that is a request to process the processing object data. The received data processing portion processes the processing object data in accordance with the processing request. The human detection sensor detects a human body with a preliminarily set sensitivity. The sensitivity setting portion sets, based on content of the job data, the sensitivity of the human detection sensor for a time when specific devices including the received data processing portion are in a predetermined rest state. The rest control portion causes the specific devices to transit to the rest state when a predetermined rest condition is satisfied. The return control portion causes the specific devices to transit from the rest state to a return state when the human detection sensor detects a human body in the situation where the specific devices are in the rest state, wherein larger power is consumed in the return state than in the rest state.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus 10]

An image forming apparatus 10 according to the embodiment of the present disclosure includes a print processing device 1 configured to execute a print process to form an image on a sheet 91, and executes a job concerning the print process.

Furthermore, the image forming apparatus 10 includes an image reading device 2 configured to execute an image reading process to read an image from a document sheet 92. For example, the image forming apparatus 10 is a copier or a multifunction peripheral having a copy function and a facsimile communication function.

The image forming apparatus 10 is configured to communicate with other apparatuses, such as a host apparatus 8, via a network 80 such as the Internet or a WAN (Wide Area Network). The host apparatus 8 is a computer configured to communicate with the image forming apparatus 10.

Figure 1:
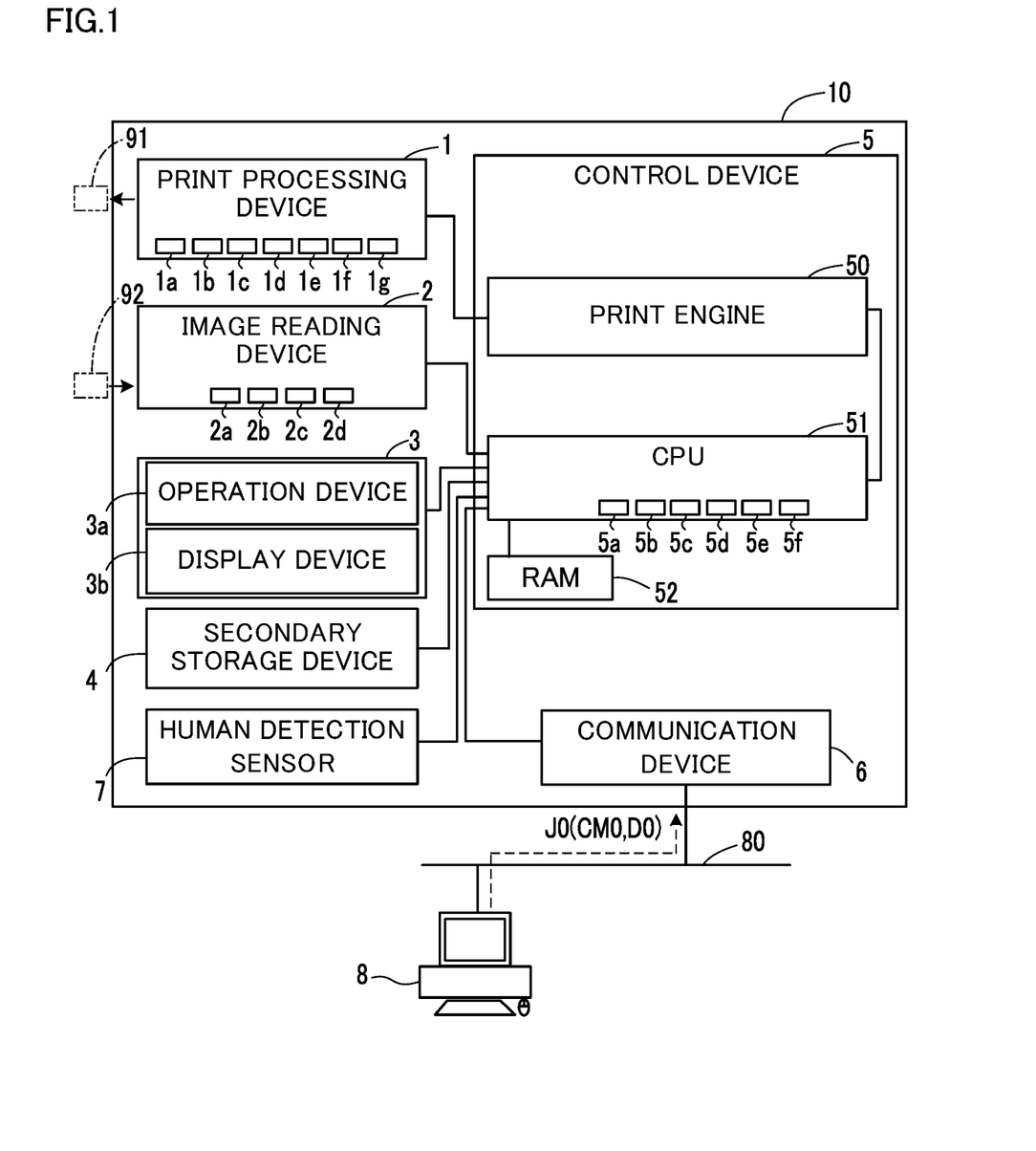
FIG. 1 is a block diagram showing a configuration of an image forming apparatus according to an embodiment of the present disclosure.

As shown in FIG. 1, the image forming apparatus 10 includes the image reading device 2, the print processing device 1, a user interface unit 3, a secondary storage device 4, a control device 5, a communication device 6, and a human detection sensor 7.

The user interface unit 3 is a user interface including an operation device 3a and a display device 3b. The operation device 3a is configured to receive user operations, and includes, for example, a return button and a touch panel. The display device 3b includes a display panel, such as a liquid crystal display, that is configured to display information.

The communication device 6 is a communication interface device configured to perform communication with other apparatuses, such as the host apparatus 8, via the network 80. All of the data transmission and reception to/from the other apparatuses by the control device 5 are performed via the communication device 6.

The secondary storage device 4 is a computer-readable nonvolatile storage device. The secondary storage device 4 is configured to store programs and various types of data. For example, either a hard disk drive or an SSD (Solid State Drive), or a combination thereof, is adopted as the secondary storage device 4.

The image reading device 2 is configured to execute a reading process of reading an image from the document sheet 92. The image reading device 2 includes a light source 2a, a scan mechanism 2b, an image sensor 2c, and an AFE (Analog Front End) 2d.

The light source 2a emits light to the document sheet 92. The scan mechanism 2b causes the light from the light source 2a to scan the document sheet 92. The image sensor 2c receives reflection light from the document sheet 92, and outputs, as an image signal, a detection signal indicating a received amount of light.

The AFE 2d converts the image signal into digital image data. In the following description, an image read from the document sheet 92 during the reading process by the image reading device 2, is referred to as a read image.

The print processing device 1 is configured to execute a print process in which to form an image on a sheet 91 by a predetermined method such as an electrophotographic method or an inkjet method.

In the present embodiment, the print processing device 1 executes the print process based on data of the read image or processing object data D0 that is received from the other apparatuses via the communication device 6. The processing object data D0 represents an image that is an object of the print process.

For example, in a case where the print processing device 1 executes the print process by the electrophotographic method, the print processing device 1 includes a sheet conveyance mechanism 1a, a photoconductor 1b, a charging device 1c, a laser scanning unit 1d, a developing device 1e, a transfer device 1f, and a fixing device 1g.

The sheet conveyance mechanism 1a conveys the sheet 91 along a predetermined path. The charging device 1c electrically charges the surface of the photoconductor 1b. The laser scanning unit 1d writes an electrostatic latent image on the electrically charged surface of the photoconductor 1b.

The developing device 1e develops the electrostatic latent image on the photoconductor 1b into a toner image. The transfer device if transfers the toner image on the photoconductor 1b to the sheet 91. The fixing device 1g fixes the toner image to the sheet 91 by heating the toner image on the sheet 91.

The human detection sensor 7 is a sensor configured to detect whether a human body is present in front of the image forming apparatus 10. For example, the human detection sensor 7 may be an infrared sensor or an ultrasonic sensor.

The control device 5 is configured to perform various calculations, data processing, and control of various electric devices included in the image forming apparatus 10. The control device 5 is configured to transmit and receive data/control signals to and from the image reading device 2, the print processing device 1, the user interface unit 3, and the communication device 6.

The control device 5 includes a print engine 50, a CPU 51, and a RAM (Random Access Memory) 52. The print engine 50 causes the print processing device 1 to execute the print process by controlling the print processing device 1 in accordance with an instruction output from the CPU 51.

The print engine 50 is implemented by a processor, such as an MPU (Micro Processing Unit) or a DSP (Digital Signal Processor), or a circuit such as an ASIC (Application Specific Integrated Circuit) that are not shown.

The CPU 51 is a processor configured to execute various types of data processing and perform control by executing programs stored in the secondary storage device 4. It is noted that another processor, such as the DSP, may execute the data processing and perform the control in place of the CPU 51.

The RAM 52 is a volatile storage device configured to primarily store: the programs executed by the CPU 51; and data that is output and consulted during execution of the programs by the CPU 51.

The CPU 51 operates as a main control portion 5a, a job control portion 5b, a rest control portion 5c, and a return control portion 5d as it executes the programs.

The main control portion 5a mainly controls the user interface unit 3 and the communication device 6. The job control portion 5b mainly controls the print engine 50 and the image reading device 2.

For example, when the communication device 6 receives, from the host apparatus 8, job data J0 including a job request command CM0 as a print request, the job control portion 5b outputs a received data print instruction to the print engine 50 to print the processing object data D0 that is also included in the job data J0, The job request command CM0 is a processing request that is a request to process the processing object data D0. The print request is a request for the print process.

Upon receiving the received data print instruction from the job control portion 5b, the print engine 50 causes the print processing device 1 to execute the print process based on the processing object data D0. It is noted that in the print process based on the processing object data D0, an image is formed on the sheet 91 based on the processing object data D0.

In a case where a predetermined rest condition is satisfied, the rest control portion 5c executes a process to cause predetermined specific devices, including the print processing device 1, to transit from a normal state to a rest state. The rest state is a state in which less power is consumed than in the normal state.

The normal state is a state where the print process can be executed. When instructed, in the rest state or an intermediate state, to execute the print process, the image forming apparatus 10 first transits to the normal state and then executes the print process.

It is noted that the normal state corresponds to a normal power state, and the rest state corresponds to a power saving state in which less power is consumed than in the normal power state.

For example, in the normal state, power is fed to the print processing device 1, the image reading device 2, the display device 3b, and the print engine 50. On the other hand, in the rest state, the power feed to the print processing device 1, the image reading device 2, the display device 3b, and the print engine 50 is stopped.

Furthermore, in the rest state, the rest control portion 5c causes the CPU 51 to operate in a sleep mode in which less power is consumed than in a normal mode. For example, in the sleep mode, the CPU 51 operates at a lower frequency clock than in the normal mode.

It is noted that the print processing device 1, the image reading device 2, the display device 3b, the print engine 50, and the CPU 51 are examples of the specific devices.

It is noted that the CPU 51 can receive the job data J0 via the communication device 6 even when the image forming apparatus 10 is in the rest state.

The rest condition includes a first rest condition that a no-operation state where no operation is detected on the operation device 3a, has continued for more than a predetermined no-operation set time, processes corresponding to all requests received from the host apparatus 8 have been completed, and the human detection sensor 7 has not detected a human body.

In addition, the rest condition may include a second rest condition that a predetermined rest operation has been performed on the operation device 3a. Furthermore, the rest condition may include a third rest condition that the present time belongs to a predetermined rest time period.

For example, the rest condition may be a logical addition of the first rest condition, the second rest condition, and the third rest condition.

In addition, in a case where a predetermined return condition is satisfied, the return control portion 5d causes the specific devices to transit from the rest state to the normal state. In the normal state, the return control portion 5d causes the CPU 51 to operate in the normal mode.

In the image forming apparatus 10, when an instruction to execute the print process is received in a situation where the specific devices are in the rest state, the return control portion 5d causes the specific devices to transit to the normal state and the print engine 50 causes the print processing device 1 to execute the print process.

For example, the return condition is a logical addition of a first return condition, a second return condition, and a third return condition.

The first return condition is that a predetermined return operation has been performed on the operation device 3a. The second return condition is that the job data J0 has been received from the host apparatus 8 via the communication device 6. The third return condition is that the human detection sensor 7 has detected a human body in the rest state.

Meanwhile, in the image forming apparatus 10, the job control portion 5b has a function to execute a data storing process, too. In the data storing process, the processing object data D0 that is received by the communication device 6 from the host apparatus 8, is stored in the secondary storage device 4.

When the communication device 6 receives, from the host apparatus 8, a job request command CM0 as a data storing request, the job control portion 5b executes the data storing process to store the processing object data D0 that is received together with the job request command CM0. The data storing request is a request for the data storing process, and is an example of a request to process the processing object data D0.

In the image forming apparatus 10 that is configured to execute the data storing process, the job control portion 5b has a function to execute a stored data print process, too. In the stored data print process, the job control portion 5b causes the print processing device 1 to execute the print process based on the processing object data D0 stored in the secondary storage device 4, in response to a stored data output operation performed by a user on the operation device 3a.

In the stored data print process, the job control portion 5b causes the print processing device 1 to execute the print process, via the print engine 50.

It is noted that the print processing device 1, the print engine 50, and the CPU 51 are an example of a received data processing portion that processes the processing object data D0 in accordance with the job request command CM0.

After a user performs, on the host apparatus 8, an operation to transmit the data storing request to the image forming apparatus 10, the user often performs, in a relatively short time, the stored data output operation on the operation device 3a of the image forming apparatus 10.

As a result, in many cases it is desirable that, after the image forming apparatus 10 executes, in the power saving state, the data storing process in accordance with the data storing request, the image forming apparatus 10 returns to the normal state quickly after the human detection sensor 7 detects a human body. With this configuration, when the user approaches the image forming apparatus 10 after transmitting the data storing request thereto, the image forming apparatus 10 returns from the power saving state to the normal state, so that the user can perform the stored data output operation and obtain the object print immediately.

On the other hand, after a user performs, on the host apparatus 8, an operation to transmit the print request to the image forming apparatus 10, the user often moves to the image forming apparatus 10 in a relatively short time to obtain the object print.

As a result, in many cases it is desirable from the viewpoint of power saving that, after the image forming apparatus 10 executes, in the power saving state, the print process in accordance with the print request, the human detection sensor 7 does not detect the user who approaches the image forming apparatus 10 to obtain the print.

However, when the sensitivity of the human detection sensor 7 is always kept low, a user who has approached the image forming apparatus 10 has to wait a long time before being able to operate it. This may impair the convenience of the user.

In the image forming apparatus 10, the CPU 51 executes a normal state process, a received job handling process, and a rest state process, as described below. With this configuration, the image forming apparatus 10 shortens the wait time of the user when the image forming apparatus 10 returns from the rest state to the normal state while restricting the power consumption.

In the present embodiment, the human detection sensor 7 has a function to change the sensitivity of detecting a human body in accordance with a sensitivity signal supplied from the CPU 51.

In addition, the CPU 51 further operates as a sensitivity setting portion 5e and a return state selecting portion 5f by executing the programs.

For example, the sensitivity of the human detection sensor 7 is one of a direction sensitivity, a distance sensitivity and a time sensitivity, or a combination of two or more of them.

The direction sensitivity is a direction range in which a human body can be detected. For example, the direction sensitivity is indicated by a size of a horizontal angle centered around the front direction of the human detection sensor 7. When the direction range in which a human body can be detected is wide, namely, when the horizontal angle is large, the direction sensitivity is high.

The distance sensitivity is a maximum distance at which a human body can be detected, and is indicated by a distance from the position of the human detection sensor 7. When the maximum distance at which a human body can be detected is large, the distance sensitivity is high.

A range in which a human body can be detected by the human detection sensor 7 (hereinafter, the range is referred to as a "human body detectable range") is determined by one or both of the direction sensitivity and the distance sensitivity.

The time sensitivity is a minimum stay time period for which a human body must be present in the human body detectable range in order for the human body to be detected. When the minimum stay time period is short, the time sensitivity is high.

The CPU 51 outputs a sensitivity setting signal to the human detection sensor 7 as it operates as the sensitivity setting portion 5e, the sensitivity setting signal specifying one or more of the direction sensitivity, the distance sensitivity, and the time sensitivity.

The human detection sensor 7 includes a circuit that adjusts one or more of the direction sensitivity, the distance sensitivity, and the time sensitivity in accordance with the sensitivity setting signal. That is, the human detection sensor 7 performs detection of a human body with a sensitivity that is preliminarily set by the sensitivity setting signal.

In addition, in the present embodiment, the main control portion 5a has a function to set either a standard return mode or a special return mode as a return mode in accordance with a return mode setting operation performed on the operation device 3a.

In a case where the return mode has been set to the standard return mode, when the return condition is satisfied in a situation where the specific devices are in the rest state, the return control portion 5d causes the specific devices to transit from the rest state to the normal state.

On the other hand, in a case where the return mode has been set to the special return mode, when the return condition is satisfied in a situation where the specific devices are in the rest state, the return control portion 5d causes the specific devices to transit from the rest state to a specified return state.

The specified return state is a state that is preliminarily selected from a plurality of candidate states by the return state selecting portion 5f. In the present embodiment, there are two candidate states: the normal state and the intermediate state. In the intermediate state, the specific devices consume larger power than in the rest state and consume smaller power than in the normal state.

For example, in the intermediate state, the power feed to the print processing device 1, the image reading device 2, the display device 3b and the print engine 50 is stopped, and the CPU 51 operates in the normal mode.

When instructed, in the rest state or the intermediate state, to execute the print process, the image forming apparatus 10 first transits to the normal state and then executes the print process.

In addition, in the image forming apparatus 10, the time required to transit from the intermediate state to the normal state is shorter than the time required to transit from the rest state to the normal state.

[Normal State Process]

Figure 2:
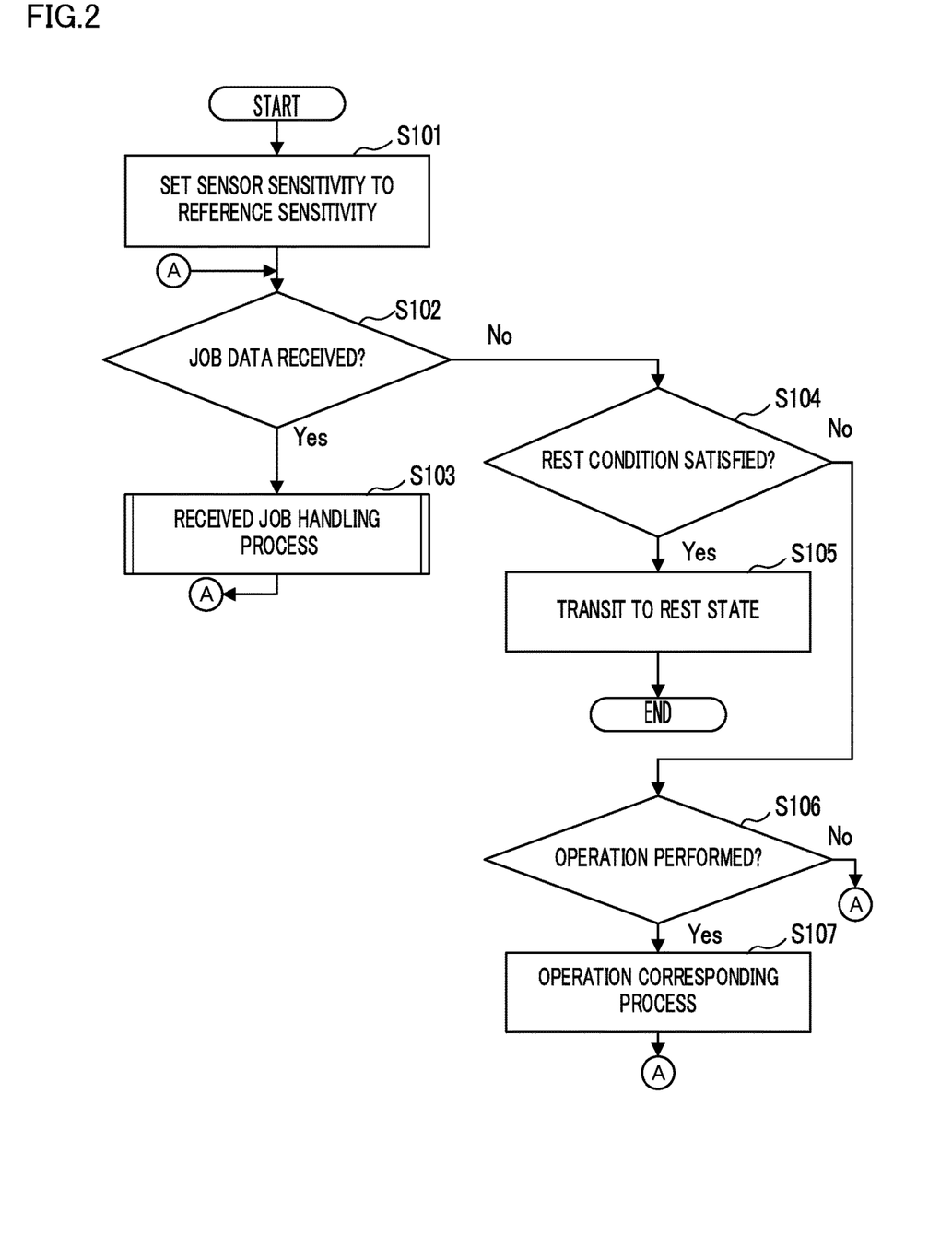
FIG. 2 is a flowchart showing an example of a procedure of a normal state process executed by the image forming apparatus according to the embodiment.

The following describes an example of a procedure of the normal state process with reference to the flowchart shown in FIG. 2.

The CPU 51 executes the normal state process shown in FIG. 2 when the return mode has been set to the special return mode, and the specific devices are in the normal state.

In the following description, S101, S102, . . . are identification signs representing a plurality of steps of the normal state process.
<Step S101>

In the normal state process, the sensitivity setting portion 5e sets the sensitivity of the human detection sensor 7 to a predetermined reference sensitivity. In the present embodiment, the reference sensitivity is lower than the maximum sensitivity of the human detection sensor 7 and higher than the minimum sensitivity of the human detection sensor 7.
<Step S102>

Subsequently, in the normal state process, the job control portion 5b determines whether or not the job data J0 has been received from the host apparatus 8.

Upon determining that the job data J0 has been received from the host apparatus 8, the job control portion 5b moves the process to step S103. Otherwise, the job control portion 5b moves the process to step S104.
<Step S103>

Figure 3:
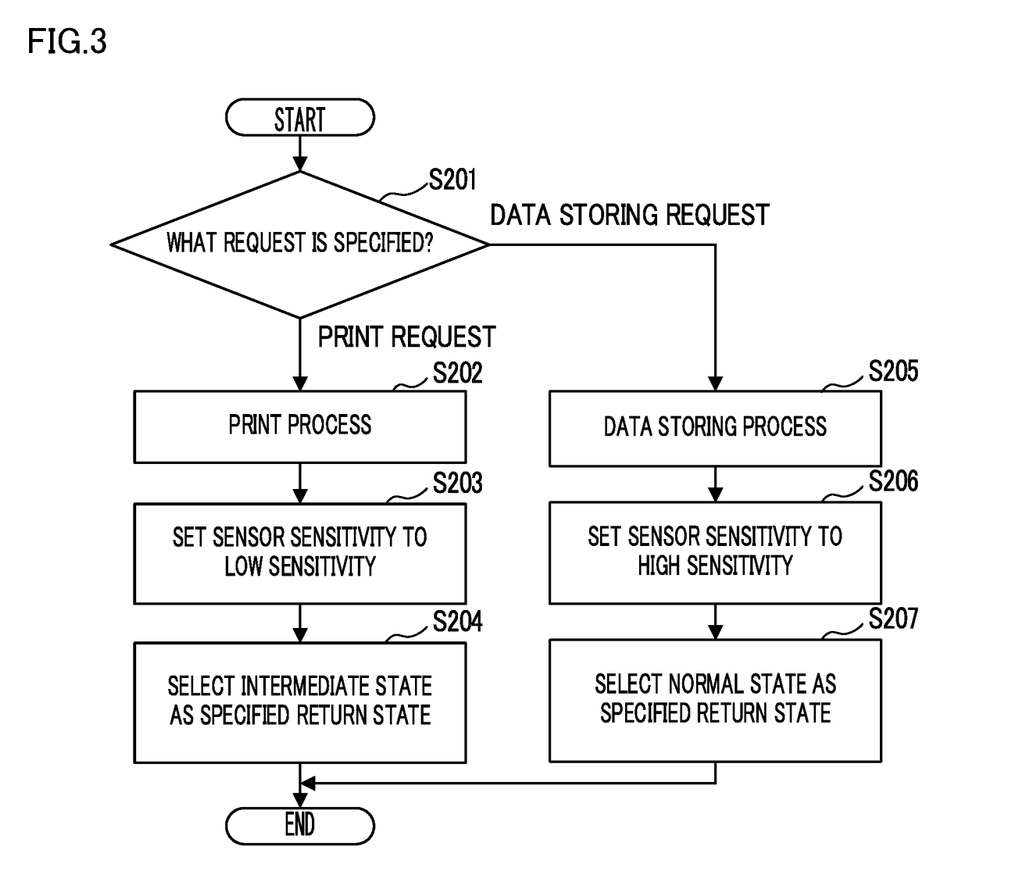
FIG. 3 is a flowchart showing an example of a procedure of a received job handling process executed by the image forming apparatus according to the embodiment.

In step S103, the job control portion 5b, the sensitivity setting portion 5e, and the return state selecting portion 5f execute the received job handling process (see FIG. 3).

As described below, in the received job handling process, a process corresponding to the job data J0 received from the host apparatus 8 is executed. After the received job handling process is completed, the job control portion 5b moves the process to step S102. It is noted that the received job handling process is described in detail below.
<Step S104>

On the other hand, in step S104, the rest control portion 5c determines whether or not the rest condition is satisfied. Upon determining that the rest condition is satisfied, the rest control portion 5c moves the process to step S105. Otherwise, the rest control portion 5c moves the process to step S106.
<Step S105>

In step S105, the rest control portion 5c causes the specific devices to transit to the rest state. This ends the normal state process.
<Step S106>

In step S106, the main control portion 5a detects whether or not an operation other than the return operation has been performed on the operation device 3a. Upon detecting that an operation other than the return operation has been performed on the operation device 3a, the main control portion 5a moves the process to step S107. Otherwise, the main control portion 5a moves the process to step S102.
<Step S107>

In step S107, the main control portion 5a or the job control portion 5b executes the process corresponding to the operation detected in step S106.

For example, when the main control portion 5a detects that the stored data output operation has been performed on the operation device 3a, the job control portion 5b executes the stored data print process.

In addition, when the main control portion 5a detects that a screen switch operation has been performed on the operation device 3a, the main control portion 5a executes a process to switch a screen displayed on the display device 3b to a screen corresponding to the screen switch operation.

[Received Job Handling Process]

Next, an example of a procedure of the received job handling process executed in step S103 of FIG. 2 is described with reference to the flowchart shown in FIG. 3.

In the following description, S201, S202, . . . are identification signs representing a plurality of steps of the received job handling process.

\<Step S201\>

In the received job handling process, the job control portion 5b selects a process to be executed next, based on the request specified in the job request command CM0 of the job data J0 received from the host apparatus 8.

When the job request command CM0 specifies the print request, the job control portion 5b moves the process to step S202. In addition, when the job request command CM0 specifies the data storing request, the job control portion 5b moves the process to step S205.

\<Step S202\>

In step S202, the job control portion 5b causes the print processing device 1 to execute the print process based on the processing object data D0 of the job data J0, via the print engine 50. Thereafter, the job control portion 5b moves the process to step S203.

\<Step S203\>

In step S203, the sensitivity setting portion 5e sets the sensitivity of the human detection sensor 7 to a predetermined low sensitivity that is lower than the reference sensitivity. Thereafter, the sensitivity setting portion 5e moves the process to step S204.

It is noted that setting the sensitivity of the human detection sensor 7 to the low sensitivity includes disabling the human detection sensor 7, namely, includes setting the sensitivity of the human detection sensor 7 to such a low level that does not allow a human body to be detected.

\<Step S204\>

In step S204, the return state selecting portion 5f selects the intermediate state as the specified return state. Thereafter, the return state selecting portion 5f ends the received job handling process.

\<Step S205\>

In step S205, the job control portion 5b executes the data storing process on the processing object data D0 specified in the job data J0 received from the host apparatus 8. Thereafter, the job control portion 5b moves the process to step S206.

\<Step S206\>

In step S206, the sensitivity setting portion 5e sets the sensitivity of the human detection sensor 7 to a predetermined high sensitivity that is higher than the reference sensitivity. Thereafter, the sensitivity setting portion 5e moves the process to step S207.

\<Step S207\>

In step S207, the return state selecting portion 5f selects the normal state as the specified return state. Thereafter, the return state selecting portion 5f ends the received job handling process.

As described above, the sensitivity setting portion 5e sets the sensitivity of the human detection sensor 7 for a time when the specific devices are in the rest state, based on the content of the job data J0 (see steps S201 to S203, and S205 to S206 of FIG. 3).

Specifically, when the job data J0 specifies the request for the print process, the sensitivity setting portion 5e sets the sensitivity of the human detection sensor 7 to a lower sensitivity than when the job data J0 specifies the request for the data storing process.

In addition, the return state selecting portion 5f selects a return state from a plurality of predetermined candidate states, based on the content of the job data J0 (see steps S201, S204, and S207).

[Rest State Process]

Next, an example of a procedure of the rest state process is described with reference to the flowchart shown in FIG. 4.

Figure 4:
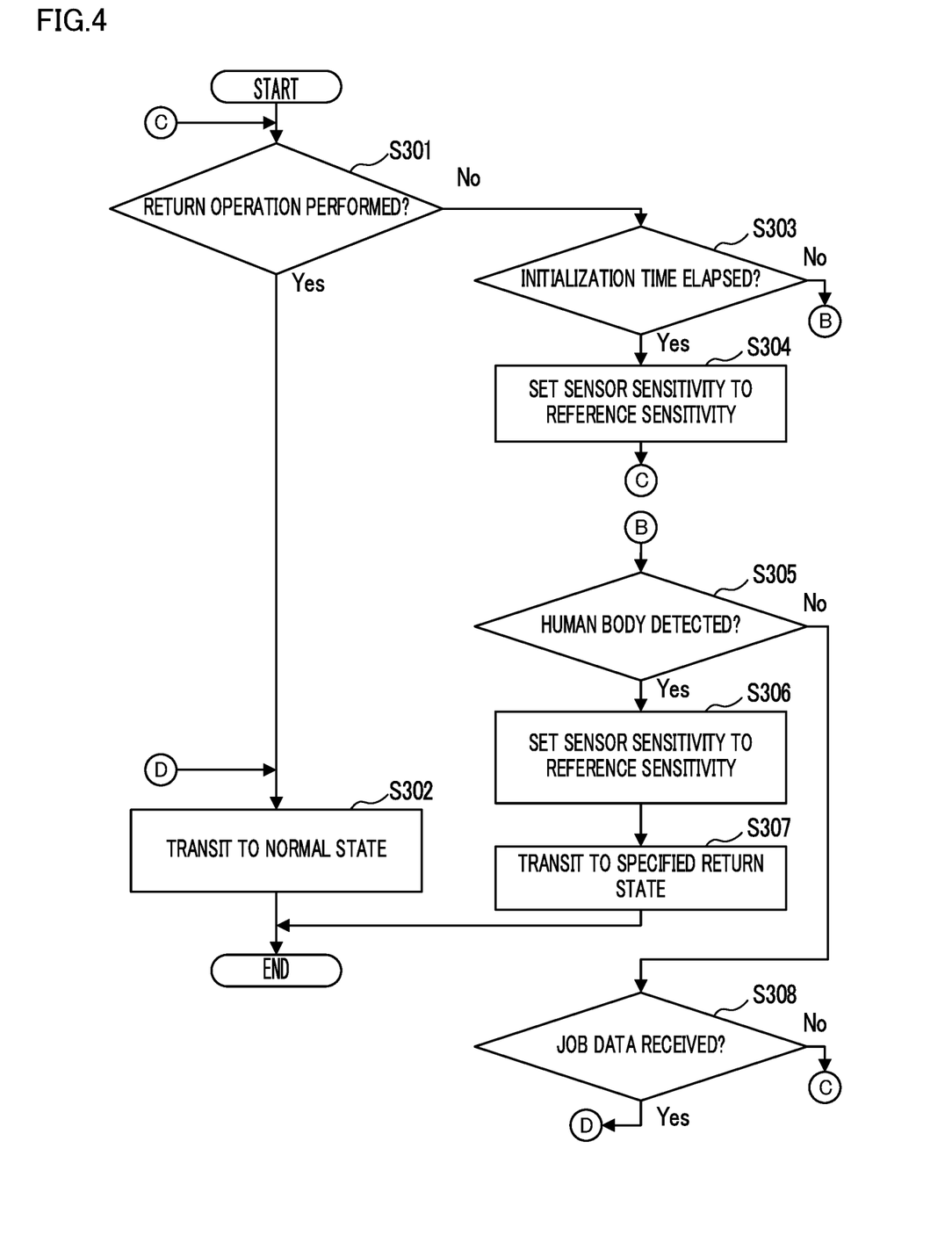
FIG. 4 is a flowchart showing an example of a procedure of a rest state process executed by the image forming apparatus according to the embodiment.

The CPU 51 executes the rest state process shown in FIG. 4 when the return mode has been set to the special return mode, and the specific devices are in the rest state. In the following description, S301, S302, . . . are identification signs representing a plurality of steps of the rest state process.

\<Step S301\>

When the specific devices are in the rest state, the return control portion 5d determines whether or not the return operation has been performed on the operation device 3a. That is, in step S301, the return control portion 5d determines whether or not the first return condition is satisfied.

Upon determining that the return operation has been performed on the operation device 3a, the return control portion 5d moves the process to step S302. Otherwise, the return control portion 5d moves the process to step S303. In other words, upon determining that the first return condition is satisfied, the return control portion 5d moves the process to step S302. Otherwise, the return control portion 5d moves the process to step S303.

\<Step S302\>

In step S302, the return control portion 5d causes the specific devices to transit to the normal state. This ends the rest state process, and the CPU 51 executes the normal state process shown in FIG. 2.

\<Step S303\>

In step S303, the sensitivity setting portion 5e determines whether or not a predetermined initialization time has elapsed from a predetermined measurement start point. The measurement start point is a most recent time when the job data J0 was received, or a time when processing of the processing object data D0 included in most recently received job data J0 was completed.

Upon determining that the initialization time has elapsed from the measurement start point, the sensitivity setting portion 5e moves the process to step S304. Otherwise, the sensitivity setting portion 5e moves the process to step S305.

\<Step S304\>

In step S304, the sensitivity setting portion 5e, as in step S101 of FIG. 2, sets the sensitivity of the human detection sensor 7 to the reference sensitivity. Thereafter, the sensitivity setting portion 5e moves the process to step S301.

\<Step S305\>

In step S305, the return control portion 5d determines whether or not the human detection sensor 7 has detected a human body. That is, in step S305, the return control portion 5d determines whether or not the third return condition is satisfied.

Upon determining that the human detection sensor 7 has detected a human body, the return control portion 5d moves the process to step S306. Otherwise, the return control portion 5d moves the process to step S308. In other words, upon determining that the third return condition is satisfied, the return control portion 5d moves the process to step S306. Otherwise, the return control portion 5d moves the process to step S308.

In a case where the sensitivity of the human detection sensor 7 has been set in step S203 or S206 of the received job handling process shown in FIG. 3, the process of step S305 is executed with the sensitivity set in step S203 or S206, until the elapsed time from the measurement start point reaches the initialization time.

\<Step S306\>

In step S306, the sensitivity setting portion 5e, as in step S101 of FIG. 2, sets the sensitivity of the human detection sensor 7 to the reference sensitivity. Thereafter, the sensitivity setting portion 5e moves the process to step S307.

In a case where the sensitivity of the human detection sensor 7 has been set in step S203 or S206 of the received job handling process shown in FIG. 3, the sensitivity of the human detection sensor 7 is initialized to the reference sensitivity in step S306.

<Step S307>

In step S307, the return control portion 5*d* causes the specific devices to transit to the specified return state. Thereafter, the return control portion 5*d* ends the rest state process.

As described above, the specified return state is set based on the content of the job data J0 in the received job handling process (see steps S201, S204, and S207 of FIG. 3).

When the specified return state is the normal state, the CPU 51 executes the normal state process shown in FIG. 2.

On the other hand, when the specified return state is the intermediate state, the CPU 51 executes an intermediate state process that is described below (see FIG. 5) following the process of step S307.

As described above, when a human body is detected by the human detection sensor 7 in a situation where the specific devices are in the rest state, the return control portion 5*d* causes the specific devices to transit from the rest state to the specified return state (S307). In the specified return state, larger power is consumed than in the rest state.

<Step S308>

In step S308, the return control portion 5*d* determines whether or not the job data J0 has been received from the host apparatus 8. That is, in step S308, the return control portion 5*d* determines whether or not the second return condition is satisfied.

Upon determining that the job data J0 has been received from the host apparatus 8, the return control portion 5*d* moves the process to step S302. Otherwise, the return control portion 5*d* moves the process to step S301. In other words, upon determining that the second return condition is satisfied, the return control portion 5*d* moves the process to step S302. Otherwise, the return control portion 5*d* moves the process to step S301.

When the return control portion 5*d* moves the process from step S308 to step S302, the normal state process shown in FIG. 2 is executed in a state where the job data J0 has not been processed.

In the above-described case, in step S102 of FIG. 2, the job control portion 5*b* recognizes a reception of the job data J0 from the host apparatus 8, and the received job handling process shown in FIG. 3 is executed. This allows the sensitivity of the human detection sensor 7 to be set based on the content of the job data J0, and allows the specified return state to be selected from the two candidate states (see FIG. 3).

Furthermore, in a case where the normal state process is executed after the received job handling process, the process of step S104 is executed via the process of step S102 of FIG. 2. Here, the continued time of the no-operation state that is contained in the first rest condition, is not reset even if the specific devices transit to the rest state. As a result, in step S104, it is determined that the rest condition (the first rest condition) is satisfied.

In this case, the process moves from step S104 to step S105, and the specific devices transit to the rest state immediately after the execution of the received job handling process. When the specific devices transit to the rest state in this way, the human detection sensor 7 performs detection of a human body with a sensitivity that has been set based on the content of the job data J0, until the elapsed time from the measurement start point reaches the initialization time (see steps S303 and S304 of FIG. 4).

[Intermediate State Process]

Next, an example of a procedure of the intermediate state process is described with reference to the flowchart shown in FIG. 5.

Figure 5:
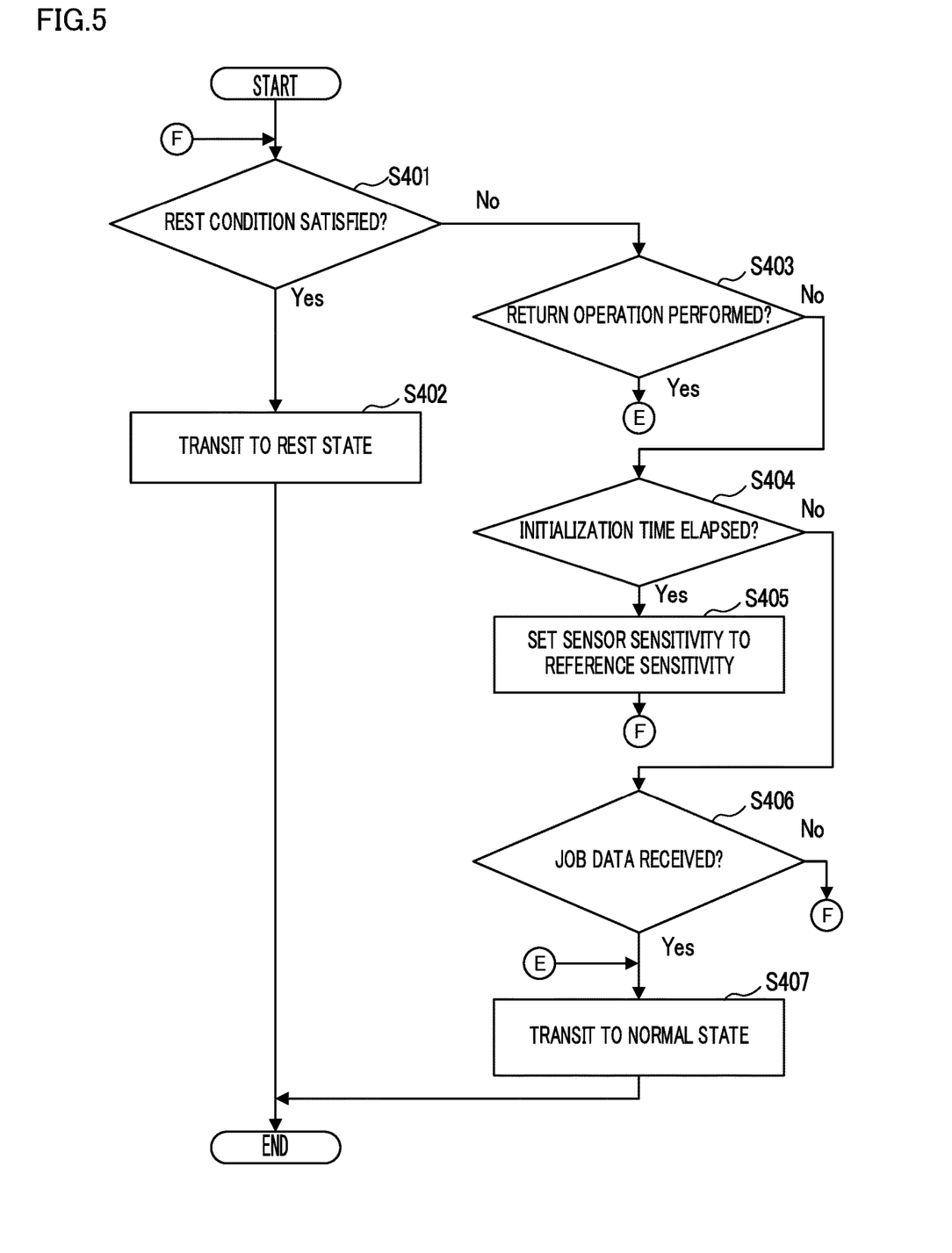
FIG. 5 is a flowchart showing an example of a procedure of an intermediate state process executed by the image forming apparatus according to the embodiment.

The CPU 51 executes the intermediate state process shown in FIG. 5 when the return mode has been set to the special return mode, and the specific devices are in the intermediate state. In the following description, S401, S402, . . . are identification signs representing a plurality of steps of the intermediate state process.

<Step S401>

When the specific devices are in the rest state, the rest control portion 5*c*, as in step S104 of FIG. 2, determines whether or not the rest condition is satisfied. Upon determining that the rest condition is satisfied, the rest control portion 5*c* moves the process to step S402. Otherwise, the rest control portion 5*c* moves the process to step S403.

<Step S402>

In step S402, the rest control portion 5*c* causes the specific devices to transit to the rest state. This ends the intermediate state process.

<Step S403>

In step S403, the return control portion 5*d*, as in step S301 of FIG. 4, determines whether or not the return operation has been performed on the operation device 3*a*. That is, in step S403, the return control portion 5*d* determines whether or not the first return condition is satisfied.

Upon determining that the return operation has been performed on the operation device 3*a*, the return control portion 5*d* moves the process to step S405. Otherwise, the return control portion 5*d* moves the process to step S404.

<Step S404>

In step S404, the sensitivity setting portion 5*e*, as in step S303 of FIG. 4, determines whether or not the initialization time has elapsed from the measurement start point.

Upon determining that the initialization time has elapsed from the measurement start point, the sensitivity setting portion 5*e* moves the process to step S405. Otherwise, the sensitivity setting portion 5*e* moves the process to step S406.

<Step S405>

In step S405, the sensitivity setting portion 5*e*, as in step S304 of FIG. 4, sets the sensitivity of the human detection sensor 7 to the reference sensitivity. Thereafter, the sensitivity setting portion 5*e* moves the process to step S401.

<Step S406>

In step S406, the return control portion 5*d*, as in step S308 of FIG. 4, determines whether or not the job data J0 has been received from the host apparatus 8. That is, in step S406, the return control portion 5*d* determines whether or not the second return condition is satisfied.

Upon determining that the job data J0 has been received from the host apparatus 8, the return control portion 5*d* moves the process to step S407. Otherwise, the return control portion 5*d* moves the process to step S401. In other words, upon determining that the second return condition is satisfied, the return control portion 5*d* moves the process to step S407. Otherwise, the return control portion 5*d* moves the process to step S401.

<Step S407>

In step S407, the return control portion 5*d* causes the specific devices to transit to the normal state. This ends the intermediate state process, and the CPU 51 executes the normal state process shown in FIG. 2. It is noted that if the human detection sensor 7 detects a human body in the intermediate state, the return control portion 5*d* causes the specific devices to transit to the normal state, although the procedure is omitted in FIG. 5.

As described above, there may be a case where it is determined in step S104 of FIG. 1 that the rest condition (the first rest condition) is satisfied, and the specific devices are caused to transit to the rest state, and then it is determined in step S308 of FIG. 4 that the second return condition is satisfied, and the specific devices are caused to transit to the normal state.

The first rest condition is a condition concerning continuation of the no-operation state, and the second return condition is a condition concerning reception of the job data J0.

In addition, the continued time of the no-operation state that is contained in the first rest condition is not reset even if the specific devices transit to the rest state. As a result, when the received job handling process shown in FIG. 3 ends, the specific devices are immediately caused to transit to the rest state due to the satisfaction of the first rest condition (see steps S104 and S105 of FIG. 1).

There may be a case where the image forming apparatus 10 receives the job data J0 and executes the print process as specified in the job data J0, and then the specific devices immediately transit to the rest state. Hereinafter, a state of the image forming apparatus 10 at the time in this case is referred to as a post-print rest state.

In addition, there may be a case where the image forming apparatus 10 receives the job data J0 and executes the data storing process as specified in the job data J0, and then the specific devices immediately transit to the rest state. Hereinafter, a state of the image forming apparatus 10 at the time in this case is referred to as a post-data-storage rest state.

In the post-print rest state, the sensitivity of the human detection sensor 7 is set to the low sensitivity until the elapsed time from the measurement start point reaches the initialization time (see steps S202 and S203 of FIG. 3).

Accordingly, in the post-print rest state, in a case where a user approaches the image forming apparatus 10, obtains an object print, and then immediately leaves the image forming apparatus 10, the human detection sensor 7 does not detect the user. As a result, it is avoided that the specific devices wastefully return to the normal state, and the power consumption of the image forming apparatus 10 is restricted.

On the other hand, in the post-data-storage rest state, the sensitivity of the human detection sensor 7 is set to the high sensitivity until the elapsed time from the measurement start point reaches the initialization time (see steps S205 and S206 of FIG. 3).

Accordingly, in the post-data-storage rest state, in a case where a user approaches the image forming apparatus 10 to perform the stored data output operation, the human detection sensor 7 detects the user immediately. As a result, the specific devices immediately return to the normal state, and the wait time of the user is reduced.

As described above, with the adoption of the image forming apparatus 10, it is possible to restrict the power consumption, and reduce the wait time of the user when the specific devices are caused to return from the rest state where small power is consumed, to the normal state while restricting the power consumption.

In addition, the return state selecting portion 5*f* selects the return state from a plurality of candidate states based on the content of the job data J0 (see steps S201, S204, and S207).

Specifically, when the job data J0 specifies the request for the data storing process, the return state selecting portion 5*f* selects the normal state as the specified return state. The time required to transit from the normal state to a print process executable state is shorter than the time required to transit from the intermediate state that is selected when the job data J0 specifies the request for the print process, to the print process executable state.

As a result, the image forming apparatus 10 can further reduce the wait time of a user who desires to perform the stored data output operation.

In addition, after the specific devices transit to the rest state, when the elapsed time from the measurement start point exceeds the initialization time, the sensitivity setting portion 5*e* changes the sensitivity of the human detection sensor 7 from a sensitivity that has been set based on the content of the job data J0, to the reference sensitivity (see steps S303 and S304 of FIG. 4).

Furthermore, when the return operation is performed on the operation device 3*a* after the specific devices transit to the rest state, the sensitivity setting portion 5*e* changes the sensitivity of the human detection sensor 7 from a sensitivity that has been set based on the content of the job data J0, to the reference sensitivity (see steps S301 and S302 of FIG. 4 and step S101 of FIG. 2).

With this configuration, it is possible to avoid the sensitivity of the human detection sensor 7 that has been set based on the content of the job data J0, from being kept excessively. That the elapsed time from the measurement start point exceeds the initialization time, or that the return operation is performed on the operation device 3*a*, is an example of a predetermined initialization condition. It is noted that the initialization condition may be either one of that the elapsed time from the measurement start point exceeds the initialization time, and that the return operation is performed on the operation device 3*a*.

Application Examples

In the embodiment described above, the return state selecting portion 5*f* and the process performed by it may be omitted.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
    a human detection sensor configured to detect a human body with a preliminarily set sensitivity; and
    a processor configured to:
        receive, from another apparatus, job data that includes processing object data and a processing request that is a request to process the processing object data;
        execute a received data processing portion configured to process the processing object data in accordance with the processing request;
        execute a sensitivity setting portion configured to set, based on content of the job data, the sensitivity of the human detection sensor for a time when specific devices including the received data processing portion are in a predetermined rest state;
        execute a rest control portion configured to cause the specific devices to transit to the rest state when a predetermined rest condition is satisfied; and
        execute a return control portion configured to cause the specific devices to transit from the rest state to a return state when the human detection sensor detects a human body in the situation where the specific devices are in the rest state, wherein larger power is consumed in the return state than in the rest state; and execute a return state selecting portion configured to select the return state from a plurality of predetermined candidate states, based on the content of the job data, wherein, when the processing request included in the job data is a request for a data storing process in which the processing object data is stored in a nonvolatile storage device, the return state selecting portion selects, as the return state, a candidate state among the plurality of predetermined candidate states such that a time required to transit from the candidate state to a print process executable state is shorter than when the processing request included in the job data is a request for a print process in which an image based on the processing object data is formed on a sheet.

2. The image forming apparatus according to claim 1, wherein when the processing request included in the job data is the request for the print process, the sensitivity setting portion sets the sensitivity of the human detection sensor to a lower sensitivity than when the processing request included in the job data is the request for the data storing process.

3. The image forming apparatus according to claim 1, wherein when a predetermined initialization condition is satisfied after the specific devices transit to the rest state, the sensitivity setting portion changes the sensitivity that has been set based on the content of the job data, to a predetermined reference sensitivity.

4. The image forming apparatus according to claim 3, wherein the initialization condition includes either or both of that a predetermined return operation has been performed on an operation device configured to receive user operations, and that a predetermined initialization time has elapsed from a most recent time when job data was received, or a time when processing of processing object data included in most recently received job data was completed.

* * * * *